United States Patent [19]
Petzold et al.
[11] 4,136,054
[45] Jan. 23, 1979

[54] CATIONIC TEXTILE AGENT COMPOSITIONS HAVING AN IMPROVED COLD WATER SOLUBILITY

[75] Inventors: Manfred Petzold; Günter Uphues, both of Dusseldorf; Peter Waltenberger, Hilden, all of Fed. Rep. of Germany

[73] Assignee: Henkel Kommanditgesellschaft Auf Aktien (Henkel KGaA), Dusseldorf, Fed. Rep. of Germany

[21] Appl. No.: 693,313

[22] Filed: Jun. 7, 1976

[30] Foreign Application Priority Data

Jun. 9, 1975 [DE] Fed. Rep. of Germany ....... 2525610

[51] Int. Cl.[2] ........................ D06M 1/00; C09K 11/00

[52] U.S. Cl. ................................ 252/301.21; 252/8.8; 252/301.22

[58] Field of Search ...................... 252/301.21, 301.22, 252/301.23, 8.8 R

[56] References Cited

U.S. PATENT DOCUMENTS

| | | | |
|---|---|---|---|
| 2,243,980 | 6/1941 | Rheiner et al. | 252/8.8 R X |
| 2,690,426 | 9/1954 | Jefferson et al. | 252/8.8 R |
| 3,497,556 | 2/1970 | Lanner et al. | 252/8.8 AP X |
| 3,567,635 | 3/1971 | Ballou | 252/8.8 R |
| 3,714,151 | 1/1973 | Lynes | 252/301.22 X |
| 3,758,462 | 9/1973 | Siegrist et al. | 252/301.22 X |

*Primary Examiner*—F.C. Edmundson

*Attorney, Agent, or Firm*—Hammond & Littell

[57] ABSTRACT

Cationic textile agent compositions having improved cold water solubility consisting of from 99% to 70% by weight of at least one catonic textile brighening agent, a long-chain compound which contains basic salt-forming nitrogen atoms, and from 1% to 30% by weight of salt of the condensation product of a primary amine of the formula $$R-NH_2$$

wherein R is a member selected from the group consisting of alkyl having from 8 to 22 carbon atoms, alkenyl having from 8 to 22 carbon atoms, alkadienyl having from 8 to 22 carbon atoms, and phenylalkyl having from 8 to 22 carbon atoms in the alkyl, with from 6 to 30 mols of an alkylene oxide selected from the group consisting of ethylene oxide and mixtures of ethylene oxide and propylene oxide, reacted at a temperature of from 40° C to 100° C under a pressure of at least one excess atmosphere in the presence of at least 5 mols of water per mol of amine and the absence of an alkoxylation catalyst, said salt being of an anion of an acid selected from the group consisting of inorganic acids and low-molecular-weight organic acids; as well as the method of improving the cold water solubility of cationic textile brightening agents by adding thereto from 1% to 30% by weight of the above salt of the condensation product.

14 Claims, No Drawings

CATIONIC TEXTILE AGENT COMPOSITIONS HAVING AN IMPROVED COLD WATER SOLUBILITY

RELATED ART

Cationic textile brightening agents, long-chain compounds containing basic salt-forming nitrogen atoms, owing to their properties of endowing a fiber with a soft handle and an antistatic finish, are frequently used in the production and processing of textile materials from natural or synthetic fibers. These products are produced in solid form as flakes or granulates or as aqueous concentrates of high viscosity or pasty consistency. In the preparation of dilute, cationic textile brightening baths ready for use, considerable difficulties occur, especially when the cationic textile brightening agent is mixed directly with cold water, since the products are mostly only dissolved very slowly and with intensive stirring, and the baths obtained are frequently not completely homogeneous.

OBJECTS OF THE INVENTION

An object of the present invention is the development of a cationic textile brightening agent composition with improved cold water solubility.

Another object of the present invention is the obtaining of cationic textile brightening agent compositions having improved cold water solubility consisting of from 99% to 70% by weight of at least one cationic textile brightening agent, a long-chain compound containing basic salt-forming nitrogen atoms, and from 1% to 30% by weight of a salt of the condensation product of a primary amine of the formula $$R - NH_2$$

wherein R is a member selected from the group consisting of alkyl having from 8 to 22 carbon atoms, alkenyl having from 8 to 22 carbon atoms, alkadienyl having from 8 to 22 carbon atoms, and phenylalkyl having from 8 to 22 carbon atoms in the alkyl, with from 6 to 30 mols of an alkylene oxide selected from the group consisting of ethylene oxide and mixtures of ethylene oxide and propylene oxide, reacted at a temperature of from 40° C. to 100° C. under a pressure of at least one excess atmosphere in the presence of at least 5 mols of water per mol of amine and the absence of an alkoxylation catalyst, said salt being of an anion of an acid selected from the group consisting of inorganic acids and low-molecular-weight organic acids.

A further object of the present invention is the development of the improvement of cold water solubility of cationic textile brightening agents consisting of adding thereto from 1% to 30% by weight of the above salt of the condensation product.

These and other objects of the invention will become more apparent as the description thereof proceeds.

DESCRIPTION OF THE INVENTION

The present invention relates to cationic textile brightening agent compositions having improved cold water solubility consisting of from 99% to 70% by weight of at least one cationic textile brightening agent, a long-chain compound which contains basic salt-forming nitrogen atoms, and from 1% to 30% by weight of a salt of the condensation product of a primary amine of the formula $$R - NH_2$$

wherein R is a member selected from the group consisting of alkyl having from 8 to 22 carbon atoms, alkenyl having from 8 to 22 carbon atoms, alkadienyl having from 8 to 22 carbon atoms, and phenylalkyl having from 8 to 22 carbon atoms in the alkyl, with from 6 to 30 mols of an alkylene oxide selected from the group consisting of ethylene oxide and mixtures of ethylene oxide and propylene oxide, reacted at a temperature of from 40° C. to 100° C. under a pressure of at least one excess atmosphere in the presence of at least 5 mols of water per mol of amine and the absence of an alkoxylation catalyst, said salt being of an anion of an acid selected from the group consisting of inorganic acids and low-molecular-weight organic acids. In addition, the compositions can contain from 0 to 2000%, based on the solids content, of water or an aqueous water-miscible organic solvent.

It is believed that the above salt of the condensation product is a quaternary ammonium compound of the general formula $$R_1N^{(+)}\left[(CH_2\underset{\displaystyle R_2}{\underset{|}{C}H}O)_mH\right]_3 X^{(-)}$$

wherein $R_1$ represents an alkyl or alkylaryl residue of chain lengths $C_8$-$C_{22}$ in the alkyl, $R_2$ represents hydrogen or methyl, $X^{(-)}$ represents an inorganic or organic anion, and m is an integer of from 2 to 10, although other configurations are also possible.

Cationic textile brightening agents utilized in the present invention are known long-chain compounds which contain basic salt-forming nitrogen atoms. These are present in the form of amino, imino and/or quaternary ammonium groups. They also contan higher acyl, amido and/or alkyl residues having chain lengths of 8 to 22 carbon atoms. By further reaction with polyfunctional compounds, which react with amino-hydrogen or imino-hydrogen atoms, polycondensates or polyadducts with higher molecular weights may be produced.

As a rule the cationic textile brightening agents are present as salts, especially as salts of lower carboxylic acids having 1 to 4 carbon atoms, for example, acetic acid or glycollic acid.

The cationic textile brightening agents, used within the scope of the present invention, are known compounds, the preparation of which is not claimed. The following may be mentioned as examples of such:

(a) Fatty acid amido-amine derivatives, such as are obtained by condensation of fatty acids of chain lengths of 8 to 22 carbon atoms or their reactive derivatives, such as their acid anhydrides or acid halides, with polyalkylenepolyamines, which may be possibly substituted by hydroxyalkyl residues. Examples of these compounds are the reaction products of 2.8 mols of behenic acid with 1 mol of tetraethylenepentamine, of a mixture of 1.25 mols of behenic acid and 1.55 mols of tallow fatty acid with 1 mol of tetraethylenepentamine, of 1.5 mols of hydrogenated tallow fatty acid with 1 mol of aminoethylethanolamine, of 3 mols of isostearic acid with 1 mol of pentaethylenehexamine, of 1.1 mols of hydrogenated tallow fatty acid and 0.9 mol of commercial behenic acid with 1 mol of triethylenetetramine, the aminolysis product from 0.6 mol of hardened beef tallow and 1 mol of triethylenetetramine, the aminolysis product from 0.5 mol of hardened rape oil and 1 mol of aminoethylethanolamine. The preparation of these products is effected in known way from the fatty acids and polyalkylenepolyamine concerned at elevated temperatures with removal by distillation of the water formed during the reaction, or by aminolysis of fatty acid esters, especially fatty acid triglycerides with the corresponding polyalkylenepolyamines.

(b) Condensates with increased molecular weight, which are obtained by reaction of the fatty acid amidopolyamine derivatives described under (a) with epichlorohydrin, dichlorhydrin, polyglycidyl or polychlorohydrin ethers of polyhydric alcohols or polyalkyleneglycol ether derivatives. Corresponding compounds are described in the Austrian Pat. No. 226,643 and in German Pat. Nos. 1,455,217 and 1,619,082. Austrian Pat. No. 226,643 corresponds to U.S. Pat. No. 3,163,552. The disclosure of German Pat. No. 1,445,217 was combined with other disclosures in U.S. Pat. No. 3,347,803. German Pat. No. 1,619,082 corresponds to U.S. Pat. No. 3,639,296.

The condensation reaction is carried out by bringing the components together preferably in solution, at elevated temperature. On reaching the desired degree of condensation, the reaction is stopped and the product neutralized by the addition of a lower carboxylic acid having from 1 to 6 carbon atoms, for example, alkanoic acids such as acetic acid, hydroxyalkane polycarboxylic acids, such as citric acid or hydroxyalkanoic acids, such as glycollic acid. For increasing the length of the molecule, however, other polyfunctional compounds reacting with the amino-hydrogen or imino-hydrogen, may also be used, such as isocyanates, aziridinyl compounds or di- and poly-carboxylic acids.

Suitable condensation products are obtained, for example, by reaction: of a fatty acid-amidoamine derivative obtained from hardened beef tallow and tetraethylenepentamine with epichlorhydrin, of a fatty acid amidoamine derivative obtained from 2 mols of behenic acid and 1 mol of triethylenetetramine wth epichlorhydrin, of an amidoamine derivative obtained from beef tallow and tetraethylenepentamine with a bis-glycidylether of Polyethyleneglycol 600, of a fatty acid amidoamine derivative obtained from hydrogenated tallow fatty acid and tetraethylenepentamine with the bis-glycidylether of Bisphenol A, or of a fatty acid amidoamine derivative obtained from behenic acid and tetraethylenepentamine with hexamethylene diisocyanate. The polycondensation or polyaddition leads to an increase of the molecule length, which, however, is controlled by suitable choice of the reactants and molecular proportions as well as by suitable guidance of the reaction and opportune breaking off of the reaction, so that the formation of highly cross-linked insoluble products are avoided. Ordinarily 1 mol or less of polyfunctional compounds are employed per molar equivalent of nitrogen in the condensation product.

(c) Esterification products from alkanolamines, especially triethanolamine and fatty acids of chain lengths of 8 to 22 carbon atoms. Examples of such products are the esterification product from 2 mols of behenic acid and 1 mol of triethanolamine, from 3 mols of tallow fatty acid and 1 mol of triethanolamine, from 1 mol of behenic acid and 1 mol of isostearic acid and 1 mol of triethanolamine. The esterification is carried out in known way at elevated temperature with removal by distillation of the water formed during the reaction.

(d) The cationic textile brightening agents used may also be quaternary ammonium derivatives of the compounds mentioned under (a) to (c), containing quaternary nitrogen atoms. The formation of the quaternary compounds is effected in known way, for example, by reaction of the tertiary amines with dimethyl sulfate or methyl chloride. For this purpose the condensation products mentioned under (a) are specially suitable. An example of such a product is an aminolysis product from 0.75 mol of hardened beef tallow and 1 mol of tetraethylenepentamine partially quaternarized with dimethyl sulfate.

The cationic textile brightening agents mentioned under (a) to (d) are preferably present in the form of their salts, especially as salts of alkanoic acids having from 1 to 4 carbon atoms, such as acetic acid or hydroxyalkanoic acids having 2 to 4 carbon atoms such as glycollic acid. They may be prepared in anhydrous form as flakes, needles or granulates or as highly viscous to pasty aqueous concentrates with a content of 5% to 50% of active substance. The products usually dissolve only slowly in cold water and with considerable swelling, so that the preparation of dilute solutions ready for use in practice causes considerable difficulties.

For the improvement of the solubility in cold water, 1 to 30% by weight of a salt of the condensation product of a primary amine of the formula $$R-NH_2$$

wherein R is a member selected from the group consisting of alkyl having from 8 to 22 carbon atoms, alkenyl having from 8 to 22 carbon atoms, alkadienyl having from 8 to 22 carbon atoms, and phenylalkyl having from 8 to 22 carbon atoms in the alkyl, with from 6 to 30 mols of an alkylene oxide selected from the group consisting of ethylene oxide and mixtures of ethylene oxide and propylene oxide, reacted at a temperature of from 40° C. to 100° C. under a pressure of at least one excess atmosphere in the presence of at least 5 mols of water per mol of amine and the absence of an alkoxylation catalyst, said salt being of an anion of an acid selected from the group consisting of inorganic acids and low-molecular-weight organic acid, is added to the said cationic finishing agents according to the invention. These salts of the condensation products, which are possibly quaternary ammonium compounds are marked by containing a straight or branched chain, saturated or unsaturated aliphatic hydrocarbon residue of chain of from 8 to 22 carbon atoms, preferably 12 to 18 carbon atoms linked to the nitrogen atom or an alkyl-aromatic hydrocarbon residue of chain lengths of 8 to 18 carbon atoms, as well as glycolethers or polyglycolethers likewise linked to the nitrogen atom. The glycolether or polyglycolethers are derived from ethylene oxide and/or propylene oxide. They contain 2 to 10 alkylene oxide units.

The preparation of the condensation products corresponding to the claimed salts of the same is carried out according to the process of U.S. patent applications Ser. No. 172,605, filed Aug. 17, 1971, now abandoned, and Ser. No. 583,876, filed June 5, 1975 now abandoned. According to this process, primary or secondary amines with at least one aliphatic residue with more than 3 carbon atoms are reacted at temperatures from 40° to 100° C., preferably 50° to 70° C., under pressure with lower alkylene oxides in the molar ratio of at least 1:(1+n), n being the number of active hydrogen atoms in the amine molecule, in the presence of at least 5 mols of water per mol of amine and in the absence of alkoxylation catalysts. In the case of the present invention, primary alkylamines having from 8 to 22 carbon atoms or alkylarylamines having 8 to 22 carbon atoms in the alkyl, are employed as starting materials. These are reacted with at least 6 mols of ethylene oxide and/or propylene oxide under the same conditions. Preferably 8 to 30 mols of ethylene oxide or 6 to 20 mols of ethylene oxide and 2 to 10 mols of propylene oxide are added on in the molecular ratio 3:1 to 10:1 as a mixture or preferably successively. The conversion of the condensation products obtained into the salt form is effected by neutralization with inorganic acids, for example, hydrochloric or phosphoric acid, or lower organic carboxylic acids, such as alkanoic acids having 1 to 4 carbon atoms, for example, formic acid, acetic acid, or hydroxyalkane polycarboxylic acids having 3 to 6 carbon atoms, for example, citric acid, or the like.

Examples of such reaction products are the adduct of tallow fatty alkylamine with 9 mols of ethylene oxide as the phosphate coconut fatty alkylamine with 9 mols of ethylene oxide and 2 mols of propylene oxide as the acetate oleylamine with 10 mols of ethylene oxide as the phosphate, isostearylamine with 15 mols of ethylene oxide as the acetate, tallow fatty alkylamine with 20 mols of ethylene oxide and 5 mols of propylene oxide as the citric acid salt, coconut fatty alkylamine with 8 mols of ethylene oxide as the chloride, oleylamine with 10 mols of ethylene oxide as the acetate, phenylstearylamine with 25 mols of ethylene oxide as the phosphate. The products are formed as aqueous solutions during the preparation, from which the salts can be obtained in anhydrous form by evaporation of the water. In practice further use is generally effected in the form of the aqueous solutions, which if desired may be previously concentrated by evaporation.

The preparation of the claimed compositions of the cationic textile brightening agents and the salts of the condensation products may be effected by adding either the aqueous solutions of the two products together and homogenizing by stirring, or stirring the molten textile brightening agent into a lower carboxylic acid in water, which also contains the salt of the condensation product, or by bringing together the anhydrous products in molten form and homogenization or the like by stirring. The products of the invention should preferably contain 2 to 20% by weight, referred to active substance, of the salt of the condensation product.

The preparation is preferably effected immediately following the production of the cationic textile brightening agent.

Such ready prepared products dissolve very easily and with only a small increase of viscosity in cold water and may be diluted by simple stirring, if desired also by hand, to give textile brightening solutions ready for use.

The present invention will now be further illustrated by way of the following examples which are nonlimitative.

EXAMPLES

(a) Cationic Textile Brightening Agents based on Fatty Acid Amidoamine Derivatives

EXAMPLE 1

932 gm (2.8 mols) of commercial behenic acid were melted under an atmosphere of nitrogen and reacted at a temperature of 90° C. with 205 gm (1.0 mol) of tetraethylenepentamine and 0.25 gm of hydrazine hydrate. After raising the temperature to 145° C. to 150° C., the water formed in the reaction was distilled off, while the internal temperature was raised to 200° C. over a period of 1 to 1.5 hours. The mixture was stirred for a further hour and then cooled. About 1,085 gm of fatty acid amidoamine derivative in anhydrous form was obtained.

100 gm of the amidoamine derivative were melted, treated with 1.1 mols of acetic acid per mol equivalent of amine nitrogen, and stirred into 387 gm of a hot aqueous solution containing 1.5% of a phosphate salt of a condensation product from 1 mol of phenylstearylamine and 20 mols of ethylene oxide. A slightly viscous, easily pourable solution was formed which is diluted with cold water without difficulty.

Further fatty acid amidoamine derivatives were prepared under the same conditions as indicated in Example 1. The composition is indicated in the following Table 1.

TABLE 1

| | Mols | Fatty Acid Component | Mols | Amine Component |
|---|---|---|---|---|
| a) | 1.0 | Commercial behenic acid | 1.0 | Diethylaminopropylamine |
| b) | 2.0 | Commercial behenic acid | 1.0 | Tetraethylenepentamine |
| c) | 2.0 | Commercial behenic acid | 1.0 | Triethylenetetramine |
| d) | 2.6 | Commercial behenic acid | 1.0 | Triethylenetetramine |
| e) | 3.0 | Commercial behenic acid | 1.0 | Tetraethylenepentamine |
| f) | 1.5 | Hydrogenated tallow fatty acid | 1.0 | Aminoethylethanolamine |
| g) | 2.8 | Stearic acid | 1.0 | Tetraethylenepentamine |
| h) | 1.6 | Oleic acid | 1.0 | Aminoethylethanolamine |
| i) | 3.0 | Isostearic acid | 1.0 | Tetraethylenepentamine |
| j) | 1.55 | Hydrogenated tallow fatty acid | 1.0 | Tetraethylene pentamine |
| | 1.25 | Commercial behenic acid | | |
| k) | 1.1 | Hydrogenated tallow fatty acid | 1.0 | Triethylenetetramine |
| | 0.9 | Commercial behenic acid | | |

In all cases the combination of the 100 gm of the above with the 1.5% aqueous solution of the acetic acid salt of the ethylene oxide condensation product described above led to relatively low viscosity, good water-soluble products.

EXAMPLE 2

1,048 gm (1.23 mols) of hardened beef tallow were melted under an atmosphere of nitrogen and 205 gm (1.0 mol) of tetraethylenepentamine as well as 1% by weight of sodium methylate, referred to the total charge as a 30% methanolic solution, were added. The mixture was taken to a temperature of 200° C. and stirred for two hours while maintaining this temperature. After cooling, about 1,250 gm of a light yellow, brittle product with an amino-nitrogen content of about 2.0% were obtained.

100 gm of this product were melted, treated with 11 gm of glycollic acid and stirred successively with 5 gm of a 50% aqueous solution of citric acid salt of a condensation product from 1 mol of tallow fatty alkylamine with 20 mols of ethylene oxide and 5 mols of propylene oxide as well as 384 gm of hot water. The solution had a low viscosity and could easily be diluted with cold water.

Further fatty acid amidoamine derivatives were prepared according to the given method, the composition of which is seen from the following Table 2.

TABLE 2

| | Mols | Fat components | Mols | Amine components |
|---|---|---|---|---|
| a) | 0.645 | Hardened beef tallow | 1.0 | Aminoethylethanolamine |
| b) | 0.665 | Hardened beef tallow | 1.0 | Triethylenetetramine |
| c) | 0.93 | Hardened beef tallow | 1.0 | Tetraethylenepentamine |
| d) | 1.0 | Hardened beef tallow | 1.0 | 1,3-dipropylenetriamine |
| e) | 1.0 | Beef tallow | 1.0 | 1,2-dipropylenetriamine |
| f) | 0.5 | Hardened rape oil | 1.0 | Amonoethylethanolamine |
| g) | 0.67 | Hardened rape oil | 1.0 | Aminoethylethanolamine |
| h) | 0.93 | Hardened rape oil | 1.0 | Tetraethylenepentamine |

In these cases also the combination of 100 gm of the above with the 5 gm of the 50% aqueous solution of the citric acid salt of the alkylene oxide condensation product led to good water-soluble products.

(b) Cationic Textile Brightening Agents based on Condensation Products which are Obtained by Reaction of Fatty Acid Amidoamine Derivatives with Bifunctional Compounds Reacting with the Amino-hydrogen or Imino-hydrogen

EXAMPLE 3

250 gm of the fatty acid amidoamine derivatives obtained according to Example 2 were heated with 70 gm of isopropanol to 80° C. 25 gm of epichlorhydrin were added to the clear solution and stirred for one hour. Then 39.3 gm of aqueous 60% acetic acid solution were added and the mixture was subsequently treated with 35.7 gm of a 50% aqueous solution of a phosphate salt of the condensation product from 1 mol of oleylamine and 10 mols of ethylene oxide, as well as 1,340 gm of deionized water at 80° to 85° C. A white dispersion was formed which after a short period of stirring and rapid cooling had a good pourability and a spontaneous miscibility with cold water.

In a corresponding way further epichlorhydrin condensation products were prepared (see Table 3). All products, in combination with the said phosphate salt of the ethylene oxide condensation product have a good pourability and spontaneous cold water miscibility.

TABLE 3

| | Fatty Acid Amidoamine Derivative | | Epichlorhydrin |
|---|---|---|---|
| | Type | Equivalent Amino-N | Mols |
| a) | Example 2 | 1.0 | 0.5 |
| b) | Table 1, (c) | 1.0 | 0.75 |
| c) | Table 1, (b) | 1.0 | 1.0 |
| d) | Table 1, (f) | 1.0 | 0.5 |
| e) | Table 1, (i) | 1.0 | 0.825 |
| f) | Table 1, (j) | 1.0 | 0.75 |
| g) | Table 1, (j) | 1.0 | 1.0 |
| h) | Table 2, (d) | 1.0 | 0.75 |
| i) | Table 2, (g) | 1.0 | 0.75 |

EXAMPLE 4

125 gm of a fatty acid amidoamine derivative prepared according to Example 2 with 2% amino nitrogen were heated with 25 gm of isopropanol at 75° to 80° C. and dissolved giving a clear solution. 35.7 gm (0.05 mol) of a bis-glycidylether of Polyethyleneglycol 600 were added to the solution and it was stirred for one hour. Then 20 gm of an aqueous 60% acetic acid solution were added. Subsequently, the neutralized reaction product was treated with 5.0 gm of a 50% aqueous solution of an acetic acid salt of a condensation product from behenylamine and 18 mols of ethylene oxide. The homogeneous mixture obtained was diluted with deionized water at 80° to 85° C. and a dispersion with a content of 17.5% by weight of active substance was formed. After cooling, a readily flowing cationic textile brightening agent composition spontaneously miscible with cold water was obtained.

EXAMPLE 5

200 gm of a fatty acid amidoamine derivative according to Example 1, Table 1 (j), with 3.5% amine nitrogen were heated with 50 gm of isopropanol at 80° C. and dissolved. After addition of 73.2 gm of the bis-glycidylether of Bisphenol A (10.9% epoxide oxygen) the mixture was stirred at 80° to 85° C. for one hour. Then 30 gm of 85% formic acid were added. Thereafter the neutralized reaction mixture was treated with 38 gm of a phosphate salt of a condensation product from 1 mol of tallow fatty alkylamine and 10 mols of ethylene oxide in a 50% aqueous solution. By dilution with 1,450 gm of deionized water at 80° C. and then cooling, a liquid dispersion was obtained, which could easily be diluted with cold water.

EXAMPLE 6

125 gm of an aminolysis product according to Example 2 with 2% of amino nitrogen were melted and 6.7 gm of the bis-chlorhydrin ether of Polyethyleneglycol 600 and 4 gm of isopropanol were added and the mixture stirred. 4.3 gm of 20% sodium hydroxide solution were then added. The mixture was stirred for an hour at 78° to 80° C. and treated with 20 gm of aqueous 60% acetic acid solution.

The improvement of the solubility properties of the above-mentioned reaction product was effected in the manner according to the present invention by the addition thereto of 13.0 gm of a 50% aqueous solution of a citric acid salt of a condensation product from 1 mol of tallow fatty alkylamine and 15 mols of ethylene oxide. By dilution with hot deionized water and subsequent cooling, a liquid dispersion with 20% active substance was obtained, which dissolved spontaneously in cold water giving a clear solution.

EXAMPLE 7

100 gm of a fatty acid amidoamine derivative according to Example 1, Table 1 (b), with 5.15% amino nitrogen, were dissolved at 70° C. in 25 gm of isopropanol and treated dropwise with 16.8 gm (0.1 mol) of hexamethylenediisocyanate. Then the temperature was maintained at 90° C. for one hour.

After addition of 8.5 gm of an aqueous 60% acetic acid solution for neutralization, 6.0 gm of a 50% aqueous solution of a chloride salt of a condensation product from 1 mol of coconut fatty alkylamine and 8 mols of ethylene oxide were added. The mixture was homogenized by stirring and diluted with hot deionized water. After cooling, a readily pourable dispersion easily miscible with cold water having 20% of active substance was obtained.

EXAMPLE 8

86 gm of a fatty acid amidopolyamine derivative with 5.15% amino nitrogen obtained according to Example 1, Table 1 (b), was heated at 70° C. in 21.5 gm of isopropanol and treated dropwise with 14.8 gm (0.085 mol) of hexamethylenediisocyanate. Then the temperature was raised to 90° C. and the mixture was allowed to react for a further one hour. After cooling to 80° C., the reaction mixture was treated with 13.3 gm (0.144 mol) of epichlorhydrin and again stirred for one hour. Thereafter the reaction mixture was neutralized with 14.6 gm of aqueous 60% acetic acid solution.

10.8 gm of a 50% aqueous solution of a phosphate salt of a condensation product from tallow fatty alkylamine with 10 mols of ethylene oxide were added thereto at 80° C. The mixture was diluted with 381.4 gm of hot deionized water homogenized by stirring and cooled. The dispersion formed was liquid and easily mixed with cold water.

EXAMPLE 9

91 gm of a fatty acid amidoamine derivative with 3.6% amino nitrogen prepared according to Example 1, Table 1 (g), was melted with 20 gm of isopropanol to give a clear solution and a solution of 12.8 gm (0.1 mol) of 1,6-hexamethylene-di-(N,N-ethyleneurea) in 20 gm of water was dropped in at 70° C. After the end of the addition, the reaction mixture was further stirred at 80° C. for one hour.

A good pourable dispersion, which was readily miscible with cold water, was obtained by addition of 25.7 gm of an aqueous 60% acetic acid solution and 5.8 gm of a 50% aqueous solution of a chloride salt of a condensation product from 1 mol of oleylamine and 10 mols of ethylene oxide and then stirring in of 400 gm of hot water at 80° C.

(c) Cationic Textile Brightening Agents based on Triethanolamine-Fatty Acid Esters

EXAMPLE 10

666 gm (2 mols) of a commercial behenic acid were melted and stirred at 90° C. with 150 gm (1 mol) of triethanolamine. The temperature was raised only slowly to 195° to 200° C. under an atmosphere of nitrogen and the water formed in the reaction was simultaneously distilled off, until the acid value of the reaction mixture had fallen below 5. After distilling off 36 gm of water, the reaction was finished.

A concentrate very easily dilutable with water was obtained, by heating 60 gm of the reaction product, 16 gm of an aqueous 60% acetic acid solution, 18 gm of the 50% aqueous solution of a phosphoric acid salt of a condensation product from 1 mol of tallow amine and 10 mols of ethylene oxide and 208 gm of water together at 80° C., stirring to homogenize and cooling.

In a corresponding way further triethanolamine esters were prepared, which could also be converted into a form easily soluble in cold water by addition of the said phosphonic acid salt of the ethylene oxide condensation product.

TABLE 4

| | Mols | Fatty acid | Mols of Triethanolamine |
|---|---|---|---|
| a) | 1.0 | Behenic acid, commercial | 1.0 |
| b) | 2.0 | Hardened tallow fatty acid | 1.0 |
| c) | 3.0 | Hardened tallow fatty acid | 1.0 |
| d) | 1.0 | Behenic acid, commercial | 1.0 |
| | 1.0 | Isostearic acid | |
| e) | 2.0 | Isostearic acid | 1.0 |

(d) Cationic Textile Brightening Agents Based on Derivatives of Compounds of Groups (a) to (c) Containing Quaternary Nitrogen Atoms

EXAMPLE 11

An aminolysis product from 0.75 mol of hardened beef tallow and 1.0 mol of tetraethylenepentamine was methylated with dimethyl sulfate or methyl chloride in the presence of equimolecular amounts of an alkali metal hydroxide. By separation of the layers the preponderant part of sodium methyl sulfate or sodium chloride formed was removed, and the tertiary amine obtained in a second stage of the reaction was converted into the quaternary compound with dimethyl sulfate or methyl chloride.

The consistency as well as the miscibility in cold water of the product diluted with water to 25% active substance was substantially improved by addition of 1% to 2% by weight, referred to the end product, of a phosphonic acid salt of a condensation product from 1 mol of isostearylamine with 12 mols of ethylene oxide.

Preparation of Alkylene Oxide Condensation Products

EXAMPLE 12

A suspension of 206 gm of oleyl amine and 690 gm of water was charged into a V4A-autoclave equipped with an agitator. After purging with nitrogen and heating to a temperature of 70–75° C., 450 gm of ethylene oxide were introduced over a period of 35 minutes. During this time maximum pressure was 3 at. abs. p. Agitation was continued during a post-reaction time of 35–40 min. After purging with nitrogen and cooling to 25° C. the pH of the reaction mixture was adjusted to 7.1 by addition of orthophosphoric acid. The resulting yellowish, slightly viscous liquid contained about 50 percent by weight of active substance. It was used in Example 3.

EXAMPLE 13

Following the procedure as described in Example 12 270 gm of a primary tallow amine (Composition: 6% $C_{14}$, 30% $C_{16}$, 64% $C_{18}$) suspended in 740 gm of water were reacted with 470 gm of ethylene oxide at 70° C. The ethylene oxide was added over 45 minutes. The maximum pressure was 3.5 at. abs. p. The pH of the resulting reaction mixture was adjusted to 7.0–7.2 with orthophosphoric acid. The resulting clear and colorless liquid contained about 50% by weight of active substance. It was used in Example 5.

EXAMPLE 14

In an analogous manner, 200 gm of a primary coconut fatty alkyl amine (Composition: 6% $C_8$, 6% $C_{10}$, 62% $C_{12}$, 20% $C_{14}$, 5% $C_{16}$, 1% $C_{18}$; mol. weight: 198) suspended in 520 gm of water were reacted with 355 gm of ethylene oxide which was introduced at 70° C. over a period of 30–40 minutes at a maximum pressure of 3 at. abs. p. After a post-reaction time of 40 minutes, purging and cooling to 25° C., the resulting clear and colorless liquid which showed a strong alkaline reaction was neutralized with hydrochloric acid against phenolphthalein. This solution was used in Example 7.

The preceding specific embodiments are illustrative of the practice of the invention. It is to be understood, however, that other expedients known to those skilled in the art or disclosed herein, may be employed without departing from the spirit of the invention or the scope of the claims.

We claim:

1. Cationic textile agent compositions having improved cold water solubility consisting of (1) from 99% to 70% by weight of a cationic textile brightening agent compound containing basic salt-forming nitrogen atoms selected from the group consisting of amino, imino and quaternary ammonium groups and a higher molecular weight alkanoyl group having 8 to 22 carbon atoms, in the form of a salt of a lower carboxylic acid having from 1 to 4 carbon atoms, and (2) from 1% to 30% by weight of a salt condensation product of a primary amine of the formula $$R-NH_2$$

wherein R is a member selected from the group consisting of alkyl having from 8 to 22 carbon atoms, alkenyl having from 8 to 22 carbon atoms, alkadienyl having from 8 to 22 carbon atoms, and phenylalkyl having from 8 to 22 carbon atoms in the alkyl, with from 6 to 30 mols of an alkylene oxide selected from the group consisting of ethylene oxide and mixtures of ethylene oxide and propylene oxide, reacted at a temperature of from 40° C. to 100° C. under a pressure of at least one excess atmosphere in the presence of at least 5 mols of water per mol of amine and the absense of alkoxylation catalyst, said salt being of an anion of an acid selected from the group consisting of hydrochloric acid, phosphoric acid, alkanoic acids having 1 to 4 carbon atoms and hydroxyalkane polycarboxylic acids having 3 to 6 carbon atoms.

2. The cationic textile agent composition of claim 1 wherein said salt of a condensation product is present in an amount of from 2% to 20% by weight.

3. The cationic textile agent composition of claim 1 wherein said alkylene oxide is a mixture of from 6 to 20 mols of ethylene oxide and 2 to 10 mols of propylene oxide in a molar ratio of from 3:1 to 10:1.

4. The cationic textile agent composition of claim 1 wherein R is aliphatic and has from 12 to 18 carbon atoms.

5. The cationic textile agent composition of claim 1 wherein said acid forming the salt of said condensation product is selected from the group consisting of hydrochloric acid, phosphoric acid, acetic acid and citric acid.

6. The cationic textile agent composition of claim 1 wherein said cationic textile brightening agent compound is a fatty acid amidoamine derivative from fatty acids having 8 to 22 carbon atoms and poly-lower-alkylenepolyamines.

7. The cationic textile agent composition of claim 1 wherein said cationic textile brightening agent compound is a condensation product from (1) fatty acid amidoamine derivatives of fatty acids having 8 to 22 carbon atoms and poly-lower-alkylenepolyamines and (2) polyfunctional compounds capable of reacting with a hydrogen bonded to a nitrogen atom.

8. The cationic textile agent composition of claim 1 wherein said cationic textile brightening agent compound is an esterification product of a fatty acid having 8 to 22 carbon atoms and a tri-lower alkanolamine.

9. The cationic textile agent composition of claim 1 wherein said cationic textile brightening agent compound is a partially quaternized fatty acid amidoamine derivative from fatty acids having 8 to 22 carbon atoms and poly-lower-alkylenepolyamines.

10. The cationic textile agent composition of claim 1 wherein said cationic textile brightening agent compound is a partially quaternized condensation product from (1) fatty acid amidoamine derivatives of fatty acids having 8 to 22 carbon atoms and poly-lower-alkylenepolyamines and (2) polyfunctional compounds capable of reacting with a hydrogen bonded to a nitrogen atom.

11. The cationic textile agent composition of claim 1 wherein said cationic textile brightening agent compound is a partially quaternized esterification product of a fatty acid having 8 to 22 carbon atoms and a tri-lower-alkanolamine.

12. The cationic textile composition of claim 1 wherein said cationic textile brightening agent compound is selected from the group consisting of (a) a fatty acid amidoamine derivative from fatty acids having 8 to 22 carbon atoms and poly-lower-alkylenepolyamines, (b) a condensation product from (1) fatty acid amidoamine derivatives of fatty acids having 8 to 22 carbon atoms and poly-lower-alkylenepolyamines and (2) polyfunctional compounds capable of reacting with a hydrogen bonded to a nitrogen atom, (c) an esterification product of a fatty acid having 8 to 22 carbon atoms and a tri-lower-alkanolamine, (d) a partially quaternized fatty acid amidoamine derivative from fatty acids having 8 to 22 carbon atoms and poly-lower-alkylenepolyamines, (e) a partially quaternized condensation product from (1) fatty acid amidoamine derivatives of fatty acids having 8 to 22 carbon atoms and poly-lower-alkylenepolyamines and (2) polyfunctional compounds capable of reacting with a hydrogen bonded to a nitrogen atom, and (f) a partially quaternized esterification product of a fatty acid having 8 to 22 carbon atoms and a tri-lower-alkanolamine.

13. A process for improving the solubility of cationic textile brightening agent compounds in cold water consisting essentially of adding to a cationic textile brightening agent compound containing basic salt-forming nitrogen atoms selected from the group consisting of amino, imino and quaternary ammonium groups and a higher molecular weight alkanoyl group having 8 to 22 carbon atoms, in the form of a salt of a lower carboxylic acid having from 1 to 4 carbon atoms, in molten form, from 1% to 30% by weight of a salt of the condensation product of a primary amine of the formula $$R-NH_2$$

wherein R is a member selected from the group consisting of alkyl having from 8 to 22 carbon atoms, alkenyl having from 8 to 22 carbon atoms, alkadienyl having from 8 to 22 carbon atoms, and phenylalkyl having from 8 to 22 carbon atoms in the alkyl, with from 6 to 30 mols of an alkylene oxide selected from the group consisting of ethylene oxide and mixtures of ethylene oxide and propylene oxide, reacted at a temperature of from 40° C. to 100° C. under a pressure of at least one excess atmosphere in the presence of at least 5 mols of water per mol of amine and the absence of alkoxylation catalyst, said salt being of an anion of an acid selected from the group consisting of hydrochloric acid, phosphoric acid, alkanoic acids having 1 to 4 carbon atoms and hydroxyalkane polycarboxylic acids having 3 to 6 carbon atoms, and recovering a cationic textile agent composition having cold water solubility.

14. The process of claim 13 wherein over 50% of water is also added.

* * * * *